July 17, 1956

H. B. ROOKS 2,755,458

INDICATING SYSTEM

Filed Sept. 23, 1953

INVENTOR.
HOWARD B. ROOKS
BY
ATTORNEY

INVENTOR.
HOWARD B. ROOKS

BULB-RESISTOR COMBINATIONS

INVENTOR.
HOWARD B. ROOKS
ATTORNEY

July 17, 1956  H. B. ROOKS  2,755,458
INDICATING SYSTEM
Filed Sept. 23, 1953  6 Sheets-Sheet 4

INVENTOR.
HOWARD B. ROOKS
BY
ATTORNEY

July 17, 1956   H. B. ROOKS   2,755,458
INDICATING SYSTEM

Filed Sept. 23, 1953   6 Sheets-Sheet 5

INVENTOR.
HOWARD B. ROOKS
BY
ATTORNEY

July 17, 1956  H. B. ROOKS  2,755,458
INDICATING SYSTEM
Filed Sept. 23, 1953  6 Sheets-Sheet 6

INVENTOR.
HOWARD B. ROOKS
BY
ATTORNEY

United States Patent Office 2,755,458
Patented July 17, 1956

2,755,458

INDICATING SYSTEM

Howard B. Rooks, Marion, Iowa, assignor to Collins Radio Company, Cedar Rapids, Iowa, a corporation of Iowa Application September 23, 1953, Serial No. 381,893

8 Claims. (Cl. 340—332)

This invention relates generally to indicating systems and particularly to an electronic system which lights a designated bulb for each setting of a shaft control system.

Briefly, shaft control systems permit a control switch to selectively position a remotely located shaft. When the remote shaft is connected to the tuner of a radio receiver or transmitter, the control switch will remotely tune the radio apparatus to frequencies, called channels, which correspond to the selected shaft positions.

The invention has application to the wire saving type of shaft positioning control systems described in Patent Number 2,476,673 to May and Schweighofer. The control system of this patent provides a large number of channels with relatively few control wires, and its maximum number of channels is given by the formula $2^n-1$, where $n$ is the number of control wires. The control wires are energized and grounded in permuted combinations to select the various channels.

It is therefore an object of this invention to provide an indicating system which is operated by the voltage relationships among the various control wires in the above cited patent.

Oftentimes control switches are located in dimly lighted areas; for example, airplane cockpits. Channel selction is aided in such places by a visual indicating system.

It is therefore the principal object of this invention to provide an indicating means for dimly lighted areas, which may be used with shaft positioning control systems of the type disclosed in Patent Number 2,476,673.

It is still another object of this invention to provide an indicating system which will allow an operator burdened with many matters to quickly and accurately determine an existing shaft position.

This invention consists of a plurality of resistor groups with each group connected to a different control wire, and a plurality of gas type bulbs with the terminals of each bulb connected to a resistor in each group. The resistors provide many impedance combinations for each bulb, but only one combination per channel will light a bulb. Accordingly, all other bulbs remain unlighted.

Further objects, advantages and features of this invention will become apparent to a person skilled in the art upon further study of the specification and drawings, in which:

Figure 1 is a schematic diagram of one embodiment of this invention;

Figures 2, 3, 4, and 5 show a group of schematic diagrams that illustrate the various possible arrangements for the individual bulb-resistor combinations in this embodiment; (Figures 2, 3, 4 and 5 actually comprise one diagram but were split into four figures due to lack of space on one drawing sheet.)

A shaft positioning system may always be operated with less than its maximum number of channels, and the chosen embodiment uses ten of its twelve possible positions.

Figure 1:
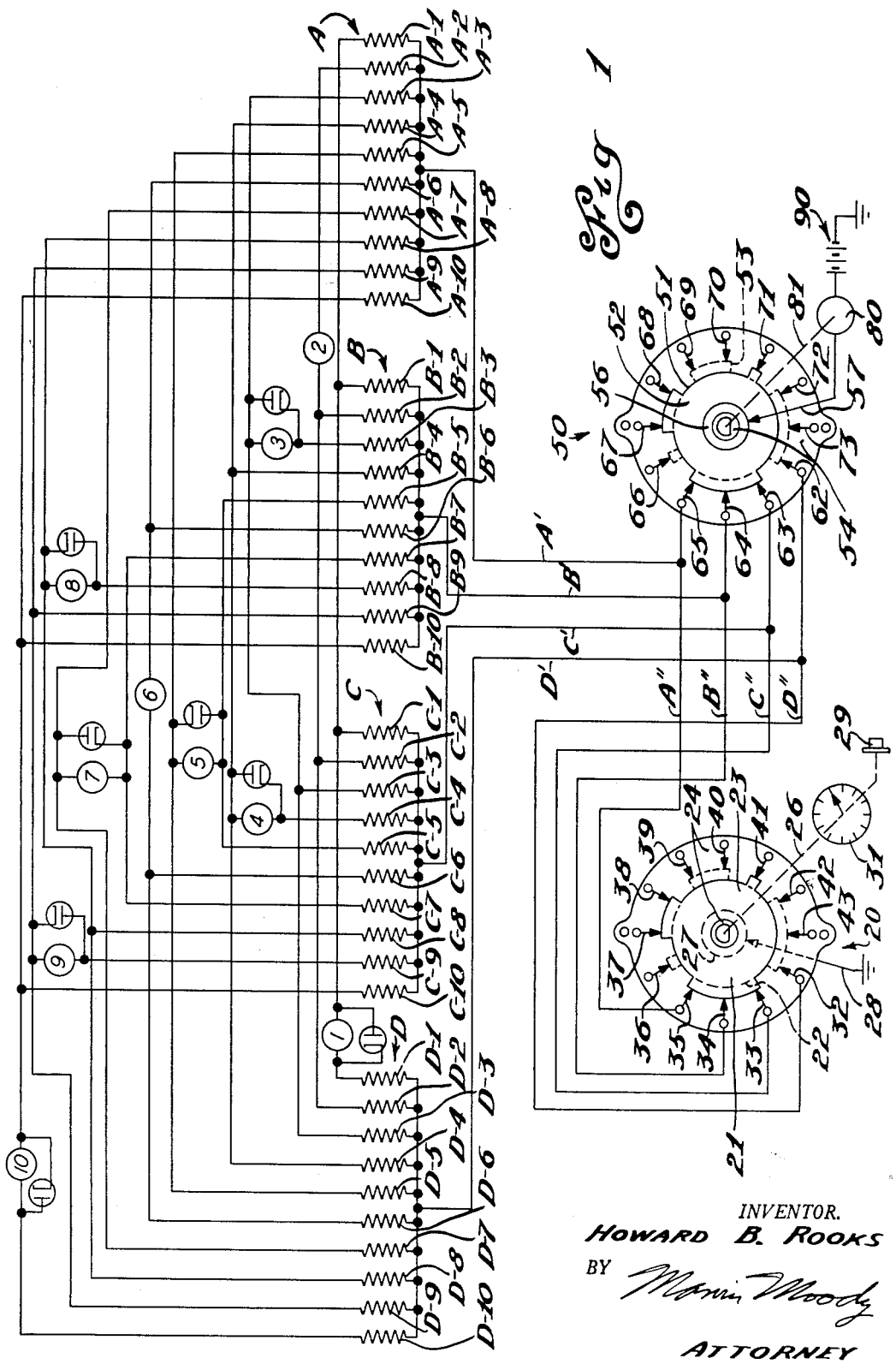

The shaft positioning system shown in Figure 1 consists generally of a control switch 20 and a seeking switch 50 connected by control wires A", B", C" and D". A motor 80 is attached to seeking switch 50, and a grounded power source 90 is connected to motor 80.

Control switch 20 has a rotor 21 that includes two annular plates 22 and 23 separated by a flat insulator disc 24. Plates 22 and 23 are identically formed and each have notched outer peripheries in three unequal segments. Plates 22 and 23 are angularly displaced from each other as shown in Figure 1.

Rotor 21 is attached to a shaft 26 by insulator disc 24. A metallic disc 27 is concentrically fixed to plate 22 and slidably engages a grounded brush 28. A knob 29 is attached to shaft 26 adjacent a fixed dial 31.

A series of stationary brushes 32 to 43 are fixed about rotor 21 in a well known manner. Each brush 32—43 has one terminal which engages the outer periphery of rotor plate 22 and another terminal which engages the outer periphery of the other rotor plate 23. Each brush will at various times engage the peripheries of plate 22, plate 23, or both plates 22 and 23.

The seeking switch has a rotor 51 which is the same as control switch rotor 21. It has a pair of plates 52 and 53 separated by an insulator disc 54 that is fastened to the shaft 81 of motor 80. A conducting disc 56 is likewise concentrically fixed to a plate 52. A brush 57 slidably engages disc 56 and is connected in series with motor 80.

Seeking switch 50 also has a number of stationary brushes 62 to 73 that are arranged in the same manner as control switch brushes 32 to 43. Brushes 32, 33, 34 and 35 of control switch 20 are respectively connected to brushes 62, 63, 64 and 65 of seeking switch 50 by means of control wires A", B", C" and D". Four leads A', B', C' and D' are respectively connected to the control wires A", B", C" and D".

This embodiment has four groups of resistors respectively designated as groups A, B, C and D, and each group has ten resistors. Group A has resistors A-1 through A-10; group B has resistors B-1 through B-10; group C has resistors C-1 through C-10; and group D has resistors D-1 through D-10. The resistors of each group are connected together at one end which is respectively connected to the indicator leads. The other ends of the resistors are connected to neon bulbs in a systematic manner as is described below.

The group connections for each bulb are shown in Figure 1. A neon bulb is provided for each channel and is numbered from 1 to 10 according to the channel it indicates.

The ten bulbs in this embodiment are connected to resistors to form ten bulb-resistor combinations as follows: Bulb 1 is connected on one side to resistor D-1 and on the other side to resistors A-1, B-1 and C-1. Bulb 2 is connected on one side to resistor A-2 and on its other side to resistors B-2, C-2 and D-2. Bulb 3 is connected on one side to resistor B-3 and on its other side to resistors A-3, C-3 and D-3. Bulb 4 is connected on one side to resistor C-4 and on the other side to resistor A-4, B-4 and D4. Bulb 5 is connected on one side to resistors A-5 and D-5 and on its other side to resistors B-5 and C-5. Bulb 6 is connected on one side to resistors C-6 and D-6 and on its other side to resistors A-6 and B-6. Bulb 7 is connected on one side to resistors A-7 and D-7 and on its other side to resistors B-7 and C-7. Bulb 8 is connected on one side to resistor B-8 and on its other side to resistors A-8, C-8 and D-8. Bulb 9 is connected on one side to resistor C-9 and on its other side to resistors A-9, B-9 and D-9. Bulb 10 is connected on one side to resistor D-10 and on its other side to resistors A-10, B-10 and C-10.

All resistors are presumed to have substantially equal resistance.

This embodiment requires that all bulbs except 2 and 6 be polarized. Non-polarized bulbs may be operated as polarized bulbs by shunting them with diodes. Figure 1 indicates the necessary polarity for each bulb.

It is well known that gas bulbs require a large initial voltage to ignite them, and without the ignition voltage they remain unlighted. However, once ignited, a much smaller voltage is required to maintain the lighted state. The operation of this invention accordingly requires the selective presentation of an ignition voltage to the gas bulbs. The resistor combinations accomplish this result.

Figure 2:
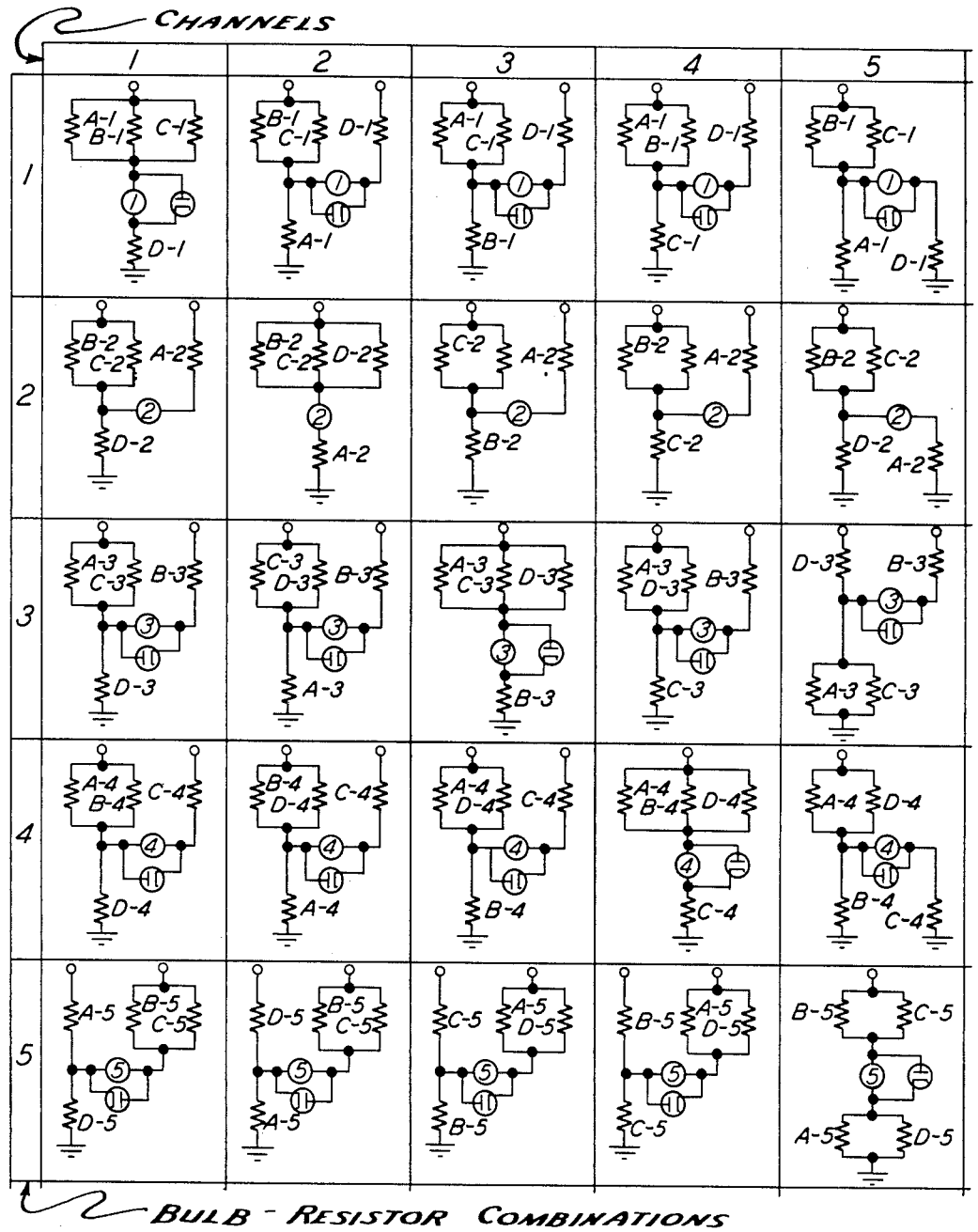
Figure 3:
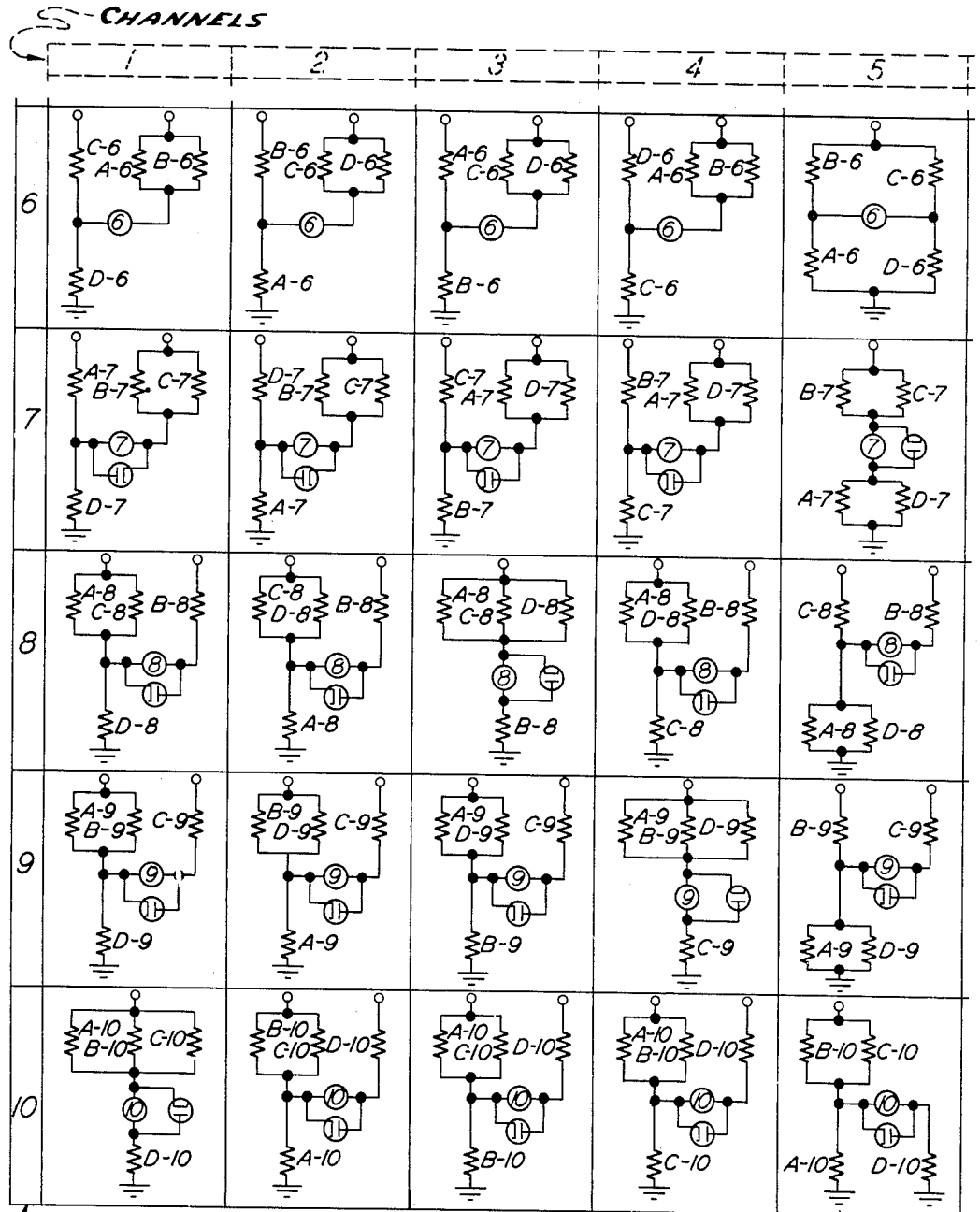
Figure 4:
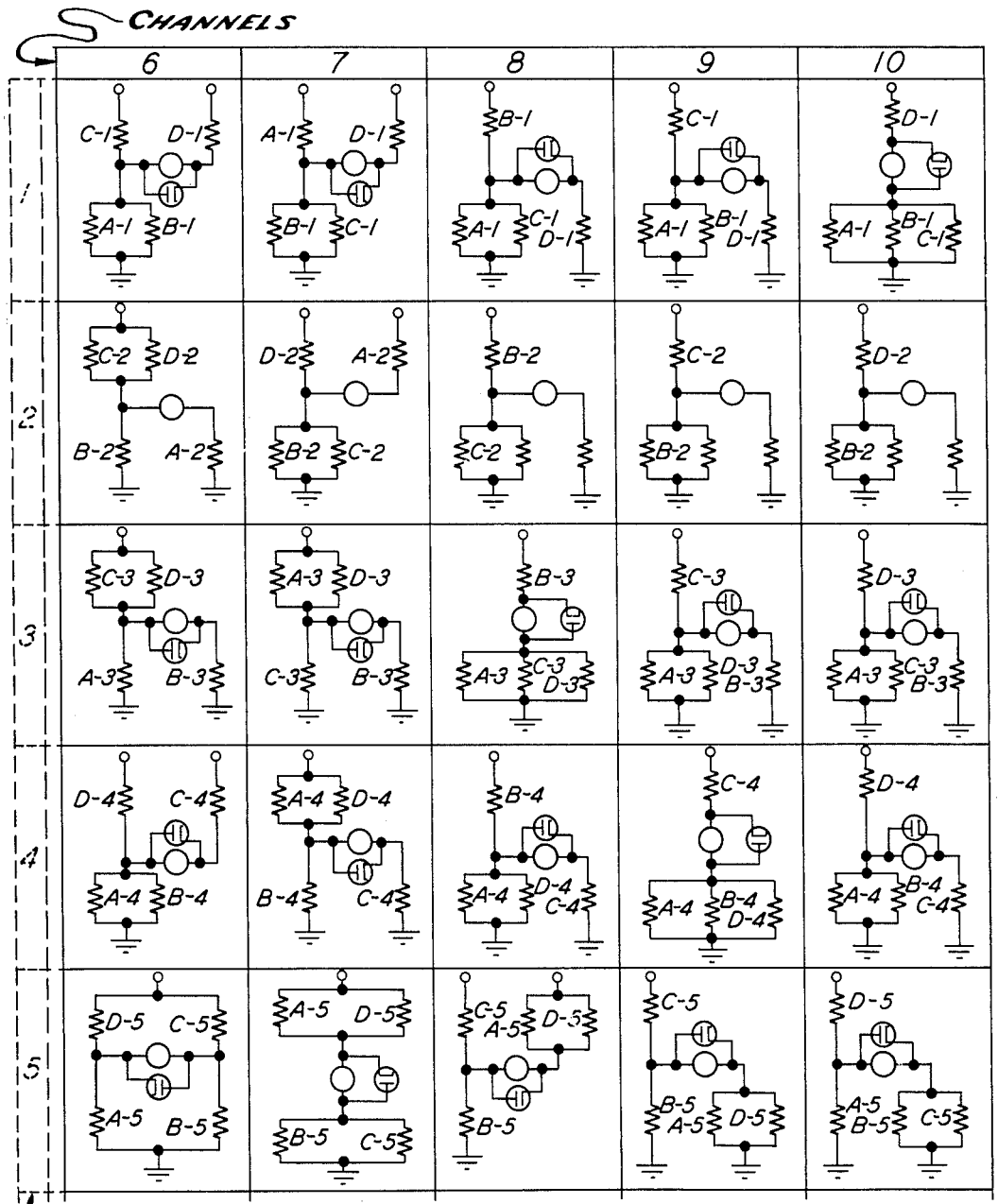
Figure 5:
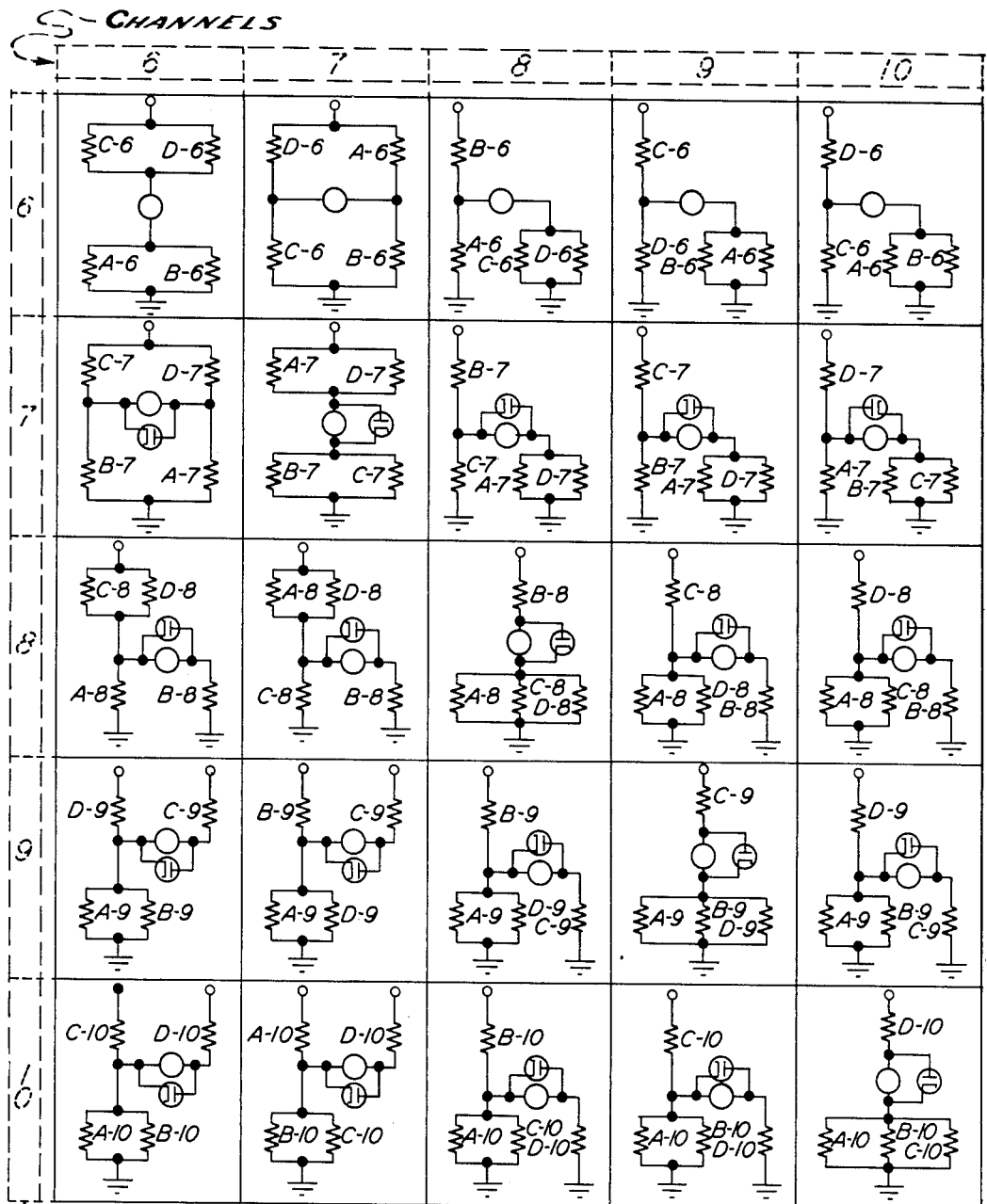
Figure 6:
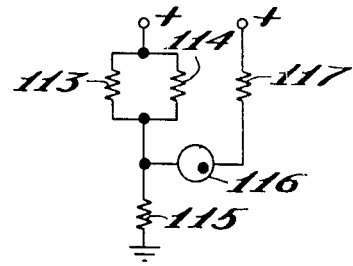
Figure 6 is a table of the grounded and energized conditions of the control wires for the various positions of the control switch.

There are a total of 100 different combinations of the ten bulbs and resistors shown in Figures 2, 3, 4 and 5. The number of permutations is apparent when it is realized that a resistor in each of the ten combinations is connected to a different control wire. For example, in channel one the bulb 1-resistor combination has positive potential applied to resistors A-1, B-1, C-1 while resistor D-1 is grounded. In channel two the bulb 1-resistor combination has positive potential applied to resistors B-1, C-1, D-1 while resistor A-1 is grounded. It is seen that a different combination of positive and ground potentials are applied to bulb 1-resistors A-1, B-1, C-1 and D-1 for each channel. The above examples are shown in Figures 2 and 4 by the horizontal rows for bulb 1.

The 100 potential permutations in Figures 2, 3, 4 and 5 can be broken down into five basic potential arrangements which are shown in Figures 7, 8, 9, 10 and 11. This is apparent from an inspection of Figures 2, 3, 4 and 5. The bulb in each arrangement has an ignition voltage slightly greater than one-half the applied voltage and is not polarized.

Figures 7, 8, 9:
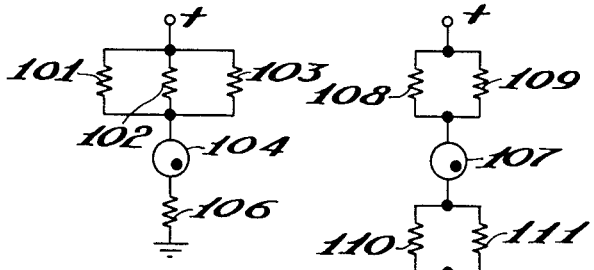
Figure 7 shows an arrangement capable of lighting a gas bulb.
Figure 8 shows another arrangement capable of lighting a gas bulb.
Figure 9 shows an arrangement incapable of lighting a gas bulb.

Figure 7 shows three parallel resistors 101, 102 and 103 connected to one side of a gas bulb 104, and a fourth resistor 106 connected to its other side. The single resistor is grounded while a potential greater than the bulb's ignition voltage is applied to the three parallel resistors. Since a gas bulb is non-conducting until ignition voltage is applied across it, bulb 104 initially presents an open circuit in series with these resistors. The positive voltage builds up across the open circuited gas bulb until the ignition voltage is exceeded. After conduction the voltage across bulb 104 drops to a lower value because of the resistors but is sufficient to maintain a lighted bulb.

The circuit of Figure 7 will also light a non-polarized bulb if the positive and ground potentials are reversed. However, a diode shunted across the bulb will allow it to light only for one direction of current flow. Therefore a reversal of potential will not light the bulb.

Figure 8 shows another basic potential arrangement that is capable of lighting a gas bulb. Bulb 107 is connected in series with parallel resistors 108 and 109 on one side and parallel resistors 110 and 111 on the other side. A positive voltage is connected to two parallel resistors and the other two are grounded. The positive voltage builds up across the bulb until it ignites and remains lighted.

The circuit of Figure 8 will also light a non-polarized bulb regardless of whether positive and ground voltages are reversed. A diode shunted across bulb 107 will likewise allow only one voltage polarity to light it.

The potential arrangement of Figure 9 is incapable of igniting a gas bulb when its ignition voltage is greater than one-half the applied voltage. A voltage divider is formed between the applied positive voltage and ground by parallel resistors 113 and 114 in series with resistor 115. One side of gas bulb 116 is connected between the resistors and its other side is connected to the positive voltage through a fourth resistor 117. Since all resistors are presumed equal in this embodiment, the voltage across the parallel resistors 113 and 114 will be one-third of the applied voltage. Therefore, one-third the applied voltage builds up across the bulb and is not sufficient to ignite it. The bulb cannot therefore be lighted by the circuit of Figure 9.

Figures 10, 11:
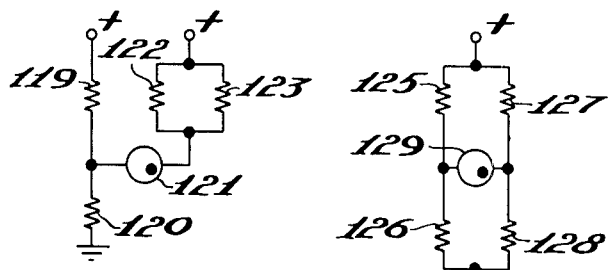
Figure 10 shows another arrangement incapable of lighting a gas bulb.
Figure 11 shows still another arrangement incapable of lighting a gas bulb.

Figure 10 shows still another potential arrangement incapable of lighting a gas bulb. This circuit forms a voltage divider of equal resistors 119 and 120 between the positive voltage and ground. The gas bulb 121 has one side connected between resistors 119 and 120 and the other side connected to the positive voltage through parallel resistors 122 and 123. This circuit therefore provides one-half the positive voltage across the bulb. Since the bulb requires an ignition voltage greater than one-half the applied voltage, it will not be lighted by the circuit of Figure 10.

The last potential arrangement in this embodiment that will not light a gas bulb is shown in Figure 11. Resistors 125 and 126 are series connected between the positive voltage and ground, and resistors 127 and 128 are likewise series connected between the positive voltage and ground. Each pair of series resistors forms a voltage divider, and the midpoints of each have equal voltages. The bulb 129 is connected between the mid-points. It cannot therefore light because no voltage exists across it.

It is therefore apparent that a lighted bulb can only be provided by the potential arrangements of Figures 7 or 8 while an unlighted bulb is provided by the potential arrangements of Figures 9, 10 or 11.

Each of the bulb-resistor combinations, except the combinations for bulbs 2 and 6, have the potential arrangement of either Figure 7 or 8 in two of the ten channels. See the vertical columns in Figures 2, 3, 4 and 5. However, in each case the two arrangements have opposite polarity. The bulbs are therefore polarized with shunt diodes as explained above and then only one of the ten channels will light.

Since the combinations for bulbs 2 and 6 have only one lighting arrangement in the ten channels, unpolarized bulbs may be used for them without ambiguity.

It is then seen that this invention provides a circuit which selectively lights only one bulb for each position of the control switch. The remaining bulbs will not light because they either have a potential arrangement as in Figures 9, 10 or 11, or have a circuit as in Figures 7 or 8 with a shunting diode whose polarity prevents their lighting.

It will be understood that this invention can easily be adapted to any channel positioning system of the type shown in Patent Number 2,476,673, regardless of the number of control wires used or the number of positions on the control switch and seeking switch. It will, of course, be necessary to increase the number of resistor groups to equal the number of control wires, and it will be necessary to increase the number of bulbs and resistors in each group to equal the number of channels.

Although a preferred embodiment has been described, it is apparent to those skilled in the art that various changes and modifications may be made therein without departing from the invention, and it is accordingly understood that this invention shall not be limited by the details of the embodiment, but rather by the scope of the following claims.

I claim:
1. Means for indicating which one of a plurality of channels in a wire saving type of shaft positioning apparatus is being used, said apparatus having a plurality of control wires energized in permuted combinations, a plurality of groups of resistors, each group of resistors having one side connected together which is also connected to a different one of said control wires respectively, a plurality of illuminating means, and each of said illuminating means connected to the remaining end of a different resistor in each of said groups of resistors to obtain an illumination voltage during a required shaft position of said apparatus.

2. Means for selectively illuminating a plurality of indicators comprising, a plurality of control wires, means for energizing said control wires in permuted combinations, a plurality of groups of resistors with the number of groups being equal to the number of control wires, each group of resistors comprising a plurality of resistors equal in number to the required number of permuted combinations which may be less than the maximum possible number of combinations, polarized indicating means equal in number to the number of required permuted combinations, one side of each group of resistors connected together and to one of said plurality of control wires respectively, each of said indicating means connected to the remaining ends of a different resistor in each of said groups to obtain an illumination voltage at its assigned permuted combination, and said resistors connected to the opposite sides of each indicating means in permuted group combinations.

3. Means for indicating different permuted combinations of energization among a plurality of control wires comprising, a plurality of groups of resistors, the number of groups of resistors being equal to the number of control wires, a plurality of resistors within each group equal in number to the number of required permuted combinations, said resistors having one end connected together in each group, the connected end of each group connected to a different one of said control wires, a plurality of polarized gas bulbs equal in number to the number of permuted combinations, and each of said bulbs connected to the remaining end of a different resistor in each group to provide each bulb with resistors connected on each side to obtain an illumination voltage at an assigned permuted combination, the number of resistors connected to each bulb being equal to the number of control wires, and the resistors connected to each bulb being permuted by groups on both sides of the bulb, and said bulbs arranged with opposite polarity in any bulb circuits having duplicate group connections.

4. An indicating system used with a shaft positioning control system having four wires connecting a control switch to a seeking switch wherein there are ten shaft positions and comprising, four groups of resistors with ten resistors in each group, each group having its resistors connected at one end to a different one of the four control wires, ten indicating bulbs, a different resistor in each of the four groups connected at its remaining end to a different bulb to provide four different resistors connected to each bulb, four of the bulbs each having connected to one side only one resistor from a different group and having its remaining three resistors connected to its other side, the next three bulbs each having connected to one side two resistors that are permuted by groups, and the last three bulbs each having connected to one side three resistors that are permuted by groups, and said bulbs polarized in an opposite manner where there is a duplication of grouping in resistor connections to the bulbs.

5. An indicating system used with shaft positioning control system having four wires connecting a control switch to a seeking switch wherein there are ten shaft positions and comprising, four groups of resistors with ten resistors in each group, each group having its resistors connected at one end to a different one of the four control wires, ten indicating bulbs, a different resistor in each of the four groups connected at its remaining end to a different bulb to provide four different resistors connected to each bulb, four of the bulbs each having connected to one side only one resistor from a different group and having its remaining three resistors connected to its other side, the next three bulbs each having connected to one side two resistors that are permuted by groups, and the last three bulbs each having connected to one side three resistors that are permuted by groups, and diodes connected in an opposite manner across each bulb that has a duplication in group connections with another bulb.

6. An indicating system used in a shaft positioning control system having $n$ number of wires connecting a control switch to a seeking switch wherein ($2^n-1$) is the maximum number of shaft positions and comprising, $n$ groups of resistors, the number of resistors in each group equal to the number of required shaft positions with said number being any number up to and including ($2^n-1$), each groups having its resistors connected together at one end to form a common end, the common end of each group connected to a different control wire, a plurality of indicating bulbs equal in number to the number of required shaft positions, a different resistor in each group connected at its remaining end to a different bulb to provide $n$ number of resistors connected to each bulb, a first set of not greater than $n$ number of said bulbs each having one resistor from a different group connected to one side and its remaining resistors connected to its other side, a second set of not greater than $n$ number of said bulbs each having two resistors connected on one side and its remaining resistors connected on its opposite side, and so on up to the last set of not greater than $n$ number of bulbs each having connected to one side a number of resistors, equal to the consecutive number of its set, with not more than one duplication of connections for each bulb, and diodes connected with opposite polarity across any bulbs having duplicate group resistor combinations, whereby a different bulb is lighted for each different permuted energization of the control wires.

7. Means for indicating different permuted combinations of energization among a plurality of control wires comprising, a plurality of groups of resistors, the number of groups of resistors being equal to the number of control wires, the plurality of resistors within each group being equal to the number of required permuted combinations and the resistors in a group having one end connected together, the connected end of each group connected to a different one of said control wires, a plurality of polarized gas bulbs equal in number to the required number of permuted combinations, and each of said bulbs connected to the remaining end of a different resistor in each group, the number of resistors connected to each bulb being equal to the number of control wires, each bulb having at least one resistor connected on one side and having more than one resistor connected on the other side, and the resistors connected to each bulb being permuted according to groups on both sides of the bulb, and said bulbs polarized and connected in an opposite manner where duplicate group resistor combinations occur, whereby a different bulb is lighted for the different permuted energizations of the control wires.

8. An indicating system used to indicate different pertations in energization among a set of $n$ wires comprising, $n$ groups of resistors, the number of resistors in each group equal to the number of different permutations required to be indicated with the number of permutations being not greater than ($2^{n-1}$), each group having its resistors connected together at one end to form a common end, the common end of each group connected to a different control wire, a plurality of indicating bulbs equal in number to the number of different permutations to be indicated, a different resistor in each group connected at its remaining end to a different bulb thereby providing $n$ number of resistors in each set of resistors connected to each bulb, the bulbs divided into sets with each set having not more than $n$ bulbs, the first set of bulbs each having one resistor connected on one side with those resistors connected to different groups, the second set of bulbs each having two resistors connected on one side of each bulb and those resistors having permuted group connections, and said bulbs polarized in an opposite manner wherever a duplication of group connections occur, whereby a different bulb is lighted for each permutation in the energization of the wires.

References Cited in the file of this patent
UNITED STATES PATENTS

| | | |
|---|---|---|
| 843,746 | Hall | Feb. 12, 1907 |
| 2,352,742 | Soffel | July 4, 1944 |
| 2,476,673 | May et al. | July 19, 1949 |
| 2,540,442 | Grosdoff | Feb. 6, 1951 |
| 2,568,348 | McCauley | Sept. 18, 1951 |
| 2,610,793 | Krause | Sept. 16, 1952 |